United States Patent
Ales et al.

(10) Patent No.: US 9,557,411 B2
(45) Date of Patent: Jan. 31, 2017

(54) SIGNAL ACQUISITION AND DISTANCE VARIATION MEASUREMENT SYSTEM FOR LASER RANGING INTERFEROMETERS

(71) Applicant: Airbus DS GmbH, Taufkirchen (DE)

(72) Inventors: Filippo Ales, Immenstaad (DE); Oliver Mandel, Baienfurt (DE); Peter Gath, Obertoringen (DE)

(73) Assignee: Airbus DS GmbH, Taufkirchen (DE)

( * ) Notice: Subject to any disclaimer, the term of this patent is extended or adjusted under 35 U.S.C. 154(b) by 0 days.

(21) Appl. No.: 14/941,937

(22) Filed: Nov. 16, 2015

(65) Prior Publication Data

US 2016/0139253 A1 May 19, 2016

(30) Foreign Application Priority Data

Nov. 14, 2014 (EP) ..................................... 14003842

(51) Int. Cl.
| | |
|---|---|
| *G01C 3/08* | (2006.01) |
| *G01S 11/12* | (2006.01) |
| *G01B 11/02* | (2006.01) |
| *G01B 9/02* | (2006.01) |

(52) U.S. Cl.
CPC ........... *G01S 11/12* (2013.01); *G01B 9/02084* (2013.01); *G01B 11/026* (2013.01); *G01B 2290/10* (2013.01)

(58) Field of Classification Search
CPC ............ G01S 11/12; G01S 17/08; G01B 9/02; G01C 3/08
USPC ....................................................... 356/4.09
See application file for complete search history.

(56) References Cited

U.S. PATENT DOCUMENTS

| | | | |
|---|---|---|---|
| 2003/0025914 A1* | 2/2003 | Demarest ........... | G01B 9/02045 356/500 |
| 2007/0127035 A1* | 6/2007 | Demarest ........... | G01B 9/02007 356/498 |

OTHER PUBLICATIONS

European Search Report, May 28, 2015.
"Intersatellite laser ranging instrument for the GRACE follow-on mission", Sheard B.S. et al, May 8, 2012.
"Intersatellite range monitoring using optical interferometry", Pierce et al., Sep. 20, 2008.

(Continued)

*Primary Examiner* — Tarifur Chowdhury
*Assistant Examiner* — Jonathon Cook
(74) *Attorney, Agent, or Firm* — Greer, Burns & Crain Ltd.

(57) ABSTRACT

A signal acquisition and distance variation measurement system for laser ranging interferometers comprising a signal acquisition unit. This unit comprises a frequency detection subsystem to detect the frequency of a received laser beam measurement signal which is buried in noise, wherein the subsystem comprises an acquisition subsystem with a wavelet packet decomposition unit and a phase/frequency detector PLL; a main PLL unit being coupled to the frequency detection subsystem for receiving the detected frequency of the measurement signal for phase estimation of the measurement signal; and a phasemeter band detection subsystem for detecting whether the measurement signal frequency is higher or lower than a reference signal frequency of a reference laser beam by operating a known change to the frequency of the reference signal and measuring the consequent change in the frequency of an interference signal for having the phase of reference signal locked to the measurement signal phase.

6 Claims, 6 Drawing Sheets

(56) References Cited

OTHER PUBLICATIONS

"Laser interferometer for spaceborne mapping of the earth's gravity field", Marina et al., Mar. 1, 2009.
"Demonstration of an Interferometric Laser Ranging System for a Follow-On Gravity Mission to GRACE", Stephens et al., Jul. 1, 2006.
"Spatial carrier-fringe pattern analysis by means of wavelet transform: wavelet transform profilometry", Jingang Zhong, Sep. 10, 2004.
"Wavelet decompostion and fractal analysis for joint measurements of laser signal delay and amplitude", A.S. Rybakov, 2001.

* cited by examiner

SIGNAL ACQUISITION AND DISTANCE VARIATION MEASUREMENT SYSTEM FOR LASER RANGING INTERFEROMETERS

CROSS-REFERENCES TO RELATED APPLICATIONS

This application claims the benefit of the European patent application No. 14003842.3 filed on Nov. 14, 2014, the entire disclosures of which are incorporated herein by way of reference.

BACKGROUND OF THE INVENTION

The invention relates to a signal acquisition and distance variation measurement system for laser ranging interferometers, in particular for use in a space application, having a signal acquisition unit.

In the past, spaceborne laser terminals have been employed only for communication purposes. However, investigations have been made to use laser instruments as radio instruments due to their reliability. As a result, future planned missions such as eLISA, NGO and, next generation geodesy missions are going to implement laser technology in order to measure distance variations between satellites of a satellite constellation as the interference of a reference beam with a measurement beam allows performing range measurements with a precision equal to a fraction of the laser wavelength. The range measurement relies on a tacking phasemeter and on the accuracy with which it is able to evaluate the phase of the interference signal.

By means of a satellite constellation, gravitational waves and planet gravimetry can be studied, as their orbital trajectories are influenced by these physical phenomena. A technique used to evaluate trajectory anomalies introduced by gravimetry or by gravitational waves is measuring the phase difference of an electromagnetic signal between a transmitting-receiving-satellite. This technique has been employed by the Gravity Recovery And Climate Experiment (GRACE) which addresses its measurements through a microwave link between a trailing and a following satellite. It is known that measurement accuracy can be highly improved using a laser link rather than a microwave link.

The accuracy of the laser range measurement relies on a phasemeter, mainly on a PLL (Phase-Locked-Loop), which measures the phase difference between a measurement beam and a reference beam. The main architecture of phasemeters is based on so-called mixing phase detector PLLs as they exploit the most accurate phase measurement when compared to other PLL concepts. The drawback of these PLLs is the small pull-in-ranges which constrains the maximum frequency offset allowable between the input signal and the VCO (Voltage Controlled Oscillator).

Before establishing a measurement link, the satellite constellation has to undergo an initial signal acquisition phase. Independently from the complexity of this mandatory process, which can vary according to the mission and/or instrument layout, the initial frequency offset between the input signal and the VCO can reach up to 200 MHz or more. The phasemeter requires a build-in frequency estimation stage algorithm, respectively, in order to properly steer the VCO frequency of the main PLL towards the incoming beatnote.

From prior art, the importance of the main PLL in addressing the range measurement accuracy is known. In this sense, efforts have been made in developing phasemeter prototypes and signal processing algorithms in order to fulfill a specific mission requirement.

A more broadband view on signal processing for the initial signal acquisition may be made by using FFT (Fast Fourier Transformation) or DFFT (Digital Fast Fourier Transformation) based algorithms. These algorithms, working in a frequency domain, require, in addition to the main PLL board, processing units where FFT algorithms are implemented. These are used to initialize the main PLL and lock the incoming measurement signal (Laser Light Signal). FFT based algorithms can also be directly implemented in FPGAs (Field Programmable Gate Array). Nevertheless, the amount of FPGA logic elements and memory required by these algorithms in order to detect with sufficient accuracy the correct frequency of the received signal in a reasonable amount of time makes it almost impossible to implement a full phasemeter in just a single FPGA.

The inference of the phasemeter detection band is implicitly designated via the mandatory signal acquisition phase. Until now, no dedicated autonomous process for the inference of the phasemeter detection band is known.

SUMMARY OF THE INVENTION

It is an object of the present invention to provide a distance variation measurement system for laser ranging interferometers which is improved over the prior art solutions.

According to the invention, a signal acquisition and distance variation measurement system for laser ranging interferometers, in particular for use in the space application, having a signal acquisition unit is provided. The signal acquisition unit comprises a frequency detection subsystem for detecting the frequency of a measurement signal of a received laser beam which is buried in noise wherein the frequency detection subsystem comprises an acquisition subsystem with a wavelet packet decomposition unit and a phase/frequency detector PLL; a main PLL unit being coupled to the frequency detection subsystem for receiving the detecting frequency of the measurement signal for phase estimation of the measurement signal; a phasemeter band detection subsystem for detecting whether the frequency of the measurement signal is higher or lower than the frequency of the reference signal of the reference laser beam by operating a known change to the frequency of the reference signal and measuring the consequent change in the frequency of an interference signal for having the phase of the reference signal locked to the phase of the measurement signal.

The distance variation measurement system according to the invention covers the gap of having a discrete time signal processing system capable of properly tuning the main PLL VCO frequency and lock the incoming light signal without the use of FFT based algorithms. The signal processing system operates in the (discrete) time domain and can be directly coded with a main PLL in FPGA boards as the general usage of the FPGA logic elements and memory is significantly reduced when compared to FFT based algorithms designed for the same purpose.

The phasemeter band detection subsystem allows a loosening of the constraint on how to perform the initial signal acquisition phase.

According to a preferred embodiment the acquisition subsystem may comprise a signal power estimation unit.

According to a further preferred embodiment the acquisition subsystem may comprise an upsampling unit.

According to a further preferred embodiment, the upsampling unit and all units after the upsampling unit are not triggered by the wavelet packet decomposition unit and the power estimation unit in case no measurement signal is received. This results in a lower probability of faults detection.

According to a further preferred embodiment the phasemeter band detection subsystem may comprise a signal storing unit, a frequency tuning unit and a band detection unit.

According to a further preferred embodiment the main PLL unit may comprise a mixing-phase detector PLL.

According to a further preferred embodiment the SNR may reach up to −10 dB in a frequency band of the measurement signal which spans from 2 MHz to 20 MHz. However, this is not a limiting case. After a proper tuning of the system's parameters and by adding (or removing) stages to the wavelet packet decomposition unit the frequency range of the measurement signal and SNR can differ from the one reported beforehand.

The distance variation measurement system for laser ranging interferometers comprises a digital and automated signal acquisition unit that can operate with low SNRs (Signal-to-Noise-Ratio) of the input signal, in particular in a frequency band that spans from 2 MHz to 20 MHz where the useful signal reaches up to −10 dB. The signal acquisition unit is made up of three major subsystems. The frequency detection subsystem, the main PLL unit and the phasemeter band detection subsystem.

The frequency detection subsystem is used to detect the frequency of the measurement signal and feed this information to the main PLL subsystem. The frequency detection subsystem combines a wavelet packet decomposition with a phase/frequency detector PLL.

The main PLL is used to exploit the measurement, i.e., the phase estimation of the measurement signal, and is implemented using mixing-phase detector PLL architecture.

The phasemeter band detection subsystem is used to detect whether the frequency of the received laser beam is higher or lower than the frequency of the reference laser beam. This information is inferred by operating a known change to the frequency of the reference beam and measuring the consequent change in the frequency of the interference signal. This operation is necessary to phase-lock the reference laser to the received light signal.

In an alternative, the phasemeter band detection subsystem may be omitted if the laser used to generate the reference beam is locked to a reference cavity and not phase-locked to the received beam.

The distance variation measurement system according to the invention is conceived for space applications with lasers. However, the distance variation measurement system described in this application may be used for other applications that differ from laser interferometry (ground or space based) as well. The distance variation measurement system may be used for acquiring and locking a more general electromagnetic signal which is buried in noise.

BRIEF DESCRIPTION OF THE DRAWINGS

The invention will be described more detailed by reference to the accompanying figures. In these figures like reference numerals denote like elements.

DETAILED DESCRIPTION OF THE PREFERRED EMBODIMENTS

The phasemeter band detection subsystem allows a loosening of the constraint on how to perform the initial signal acquisition phase.

Figure 1:
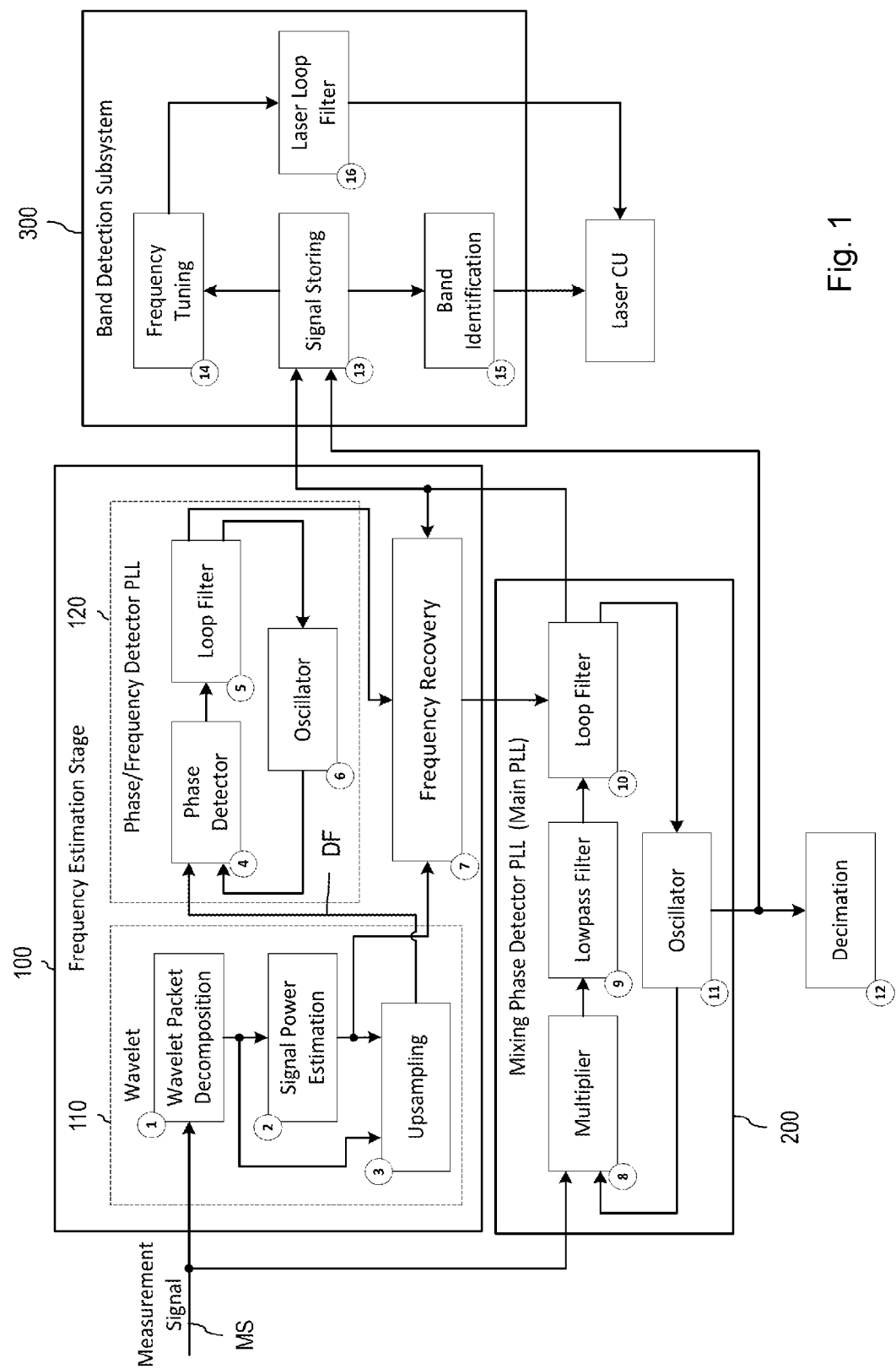
FIG. 1 is a block diagram showing the operating principle of a digital signal acquisition unit of a distance variation measurement system according to the invention.

FIG. 1 shows a block diagram illustrating the three major subsystems of the automated signal acquisition unit of a distance variation measurement system according to the invention. The three major subsystems are the frequency detection subsystem 100, a main PLL unit 200 and a phasemeter band detection subsystem 300.

Figure 2:
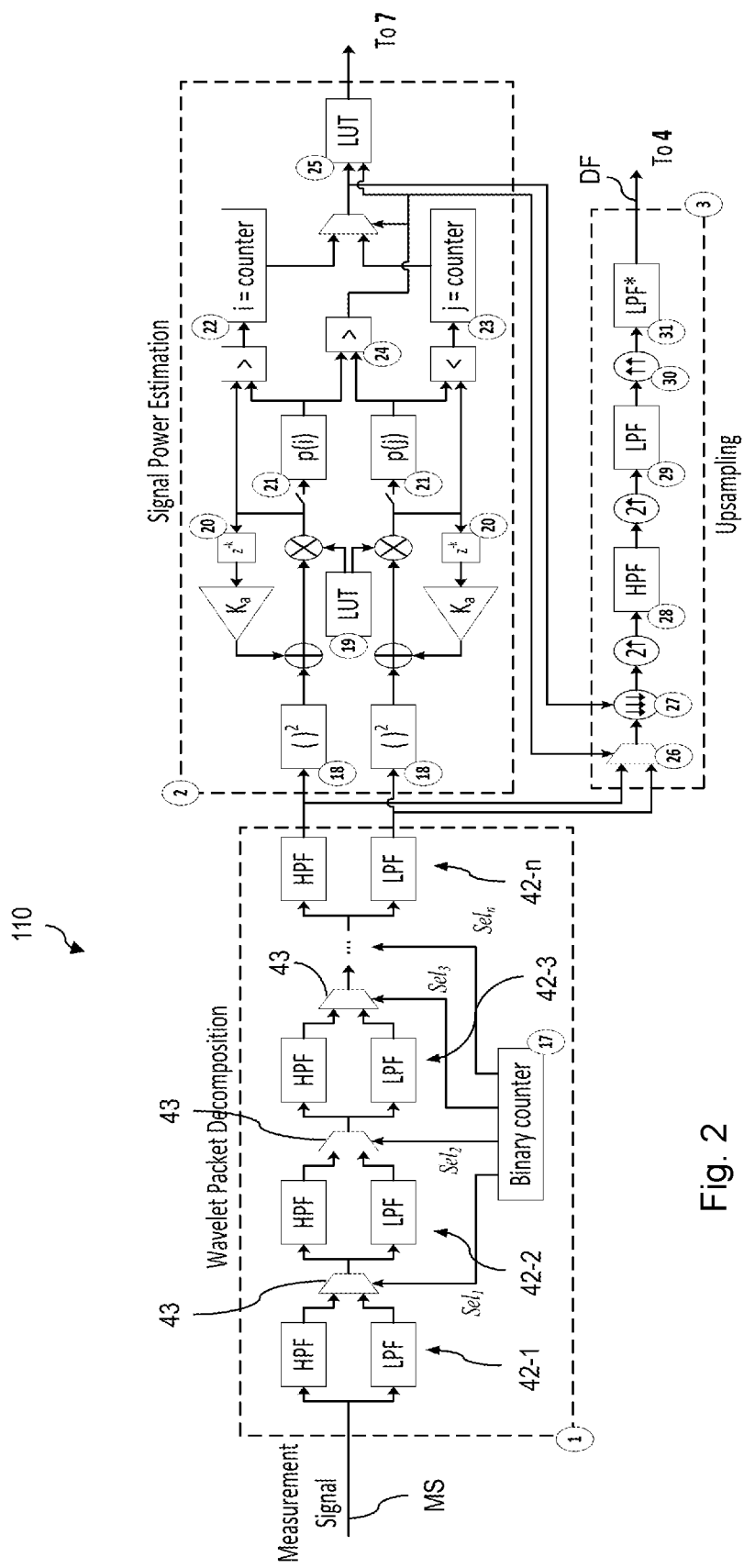
FIG. 2 is a more detailed block diagram of the frequency detection subsystem.

The frequency detection subsystem 300 is divided into two divisional subsystems: a wavelet subsystem 110 and a phase/frequency detector 120. The wavelet subsystem 110 is made up of a wavelet packet decomposition unit 1, a signal power estimation unit 2 and an upsampling unit 3. A more detailed block diagram of the wavelet subsystem 110 is shown in FIG. 2. A digitalized measurement signal MS is fed into the wavelet packet decomposition unit 1 of the wavelet subsystem 110. The wavelet packet decomposition unit 1 cuts the electronics' frequency range into several sub-bands. The signal in a sub-band has a higher SNR (Signal-to-Noise-Ratio) with respect to the SNR of the signal in the entire frequency range. Each stage 42-1, . . . , 42-n of the wavelet packet decomposition unit 1 doubles the amount of sub-bands and thus increases the SNR by 3 dB. By means of the wavelet packet decomposition unit 1, the system can operate with a low SNR of the input signal (in a frequency band that spans from 2 MHz to 20 MHz it can reach up to −10 dB). The output signals of the wavelet packet decomposition unit 1 are discrete time signals with a lower sample rate with respect to the input signal.

Figure 6:
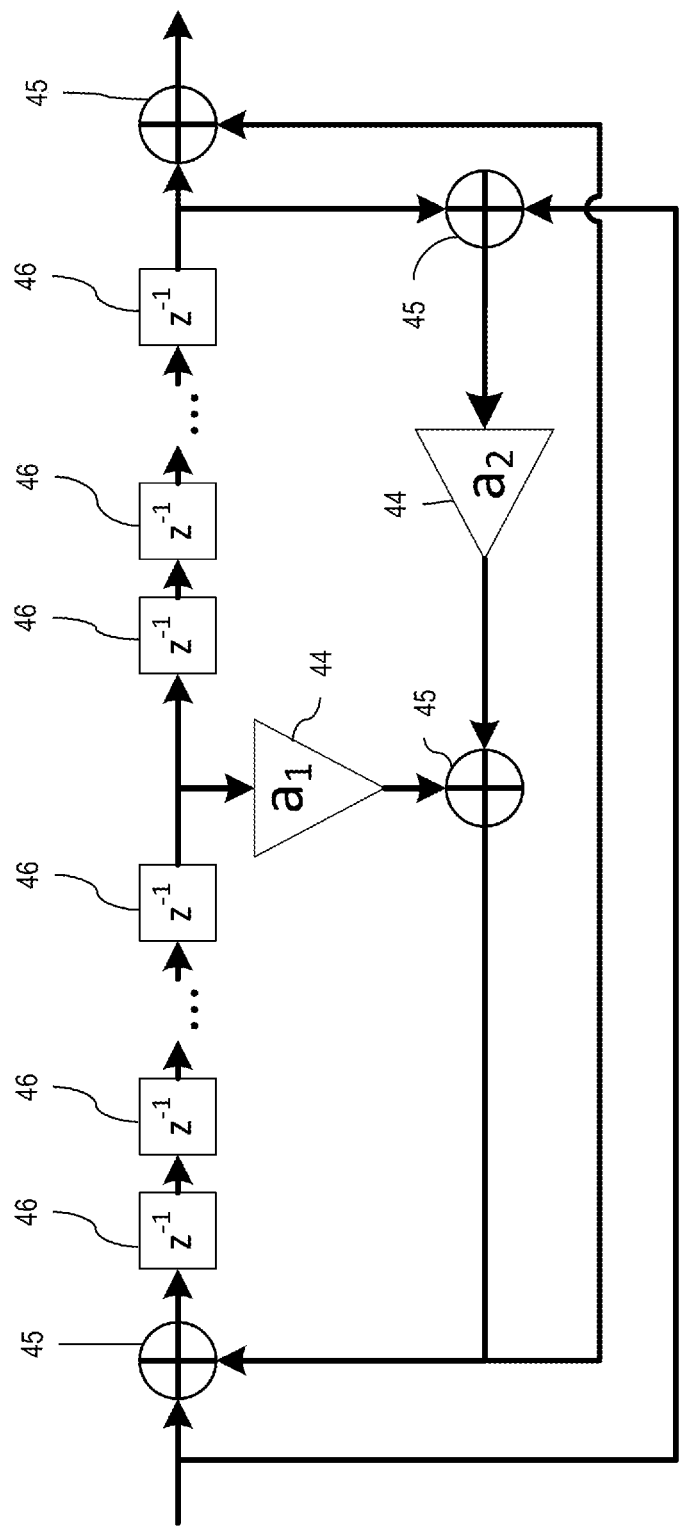
FIG. 6 is a structure of the second order allpass filter used in the n stage of a wavelet bracket decomposition unit of the frequency detection subsystem of FIG. 2.

A possible implementation of the wavelet packet decomposition unit 1 requires separate filters in each path of its tree structure. Availing of the downsampling, the filters HPF (Highpass Filter) and LPF (Lowpass Filter) starting from the second stage 42-2 run with a lower clock frequency. Taking for simplicity the second stage 42-2 as example, instead of outputting a sample every two, a filter HPF, LPF in this stage can alternate between the output signals after first stage filters. The filter implementation of the wavelet packet decomposition unit 1 is better depicted in FIG. 2. Using this expedient for all the stages 42-1, . . . , 42-n of the wavelet packet decomposition unit 1 an arbitrary number n of stages is implemented with only two filters HPF, LPF per stage. The signals between two filter stages are properly routed through a multiplexer section signal Sel1, . . . , Seln which is generated using the bits of a binary counter 17. Multiplexers of the stages 42-1, . . . , 42-n are denoted with 43. The implementation of the wavelet packet decomposition unit 1 also differs from its classical implementation as it omits a last downsampling process. Second order allpass filters in a minimum multiplierfilter structure are used to implement the wavelet packet decomposition unit 1. This is depicted in FIG. 6. In the first stage the filter is a common allpass filter and consists of adders 44, multipliers 46 and registers 47 (z−1). In the second stage 42-2, the register outputs of each filter have to match the alternating input signal. Therefore, they need to be doubled together to a shift register. The shift register of the nth stage filter is always twice the size of the shift register of the nth-1 stage filter.

The output values of the wavelet packet decomposition unit 1 are not ordered from the lowest to the highest frequency sub-band due to the signal multiplexing and the implementation of pipelined filters. Pipelining is necessary to allow higher clock frequencies without a huge consumption of logic elements. After a first stage 42-1 of the wavelet packet decomposition unit 1 there is always a delay between the input signal and the corresponding filtered signal. The task of matching the filter signal output at every clock cycle with its corresponding sub-band index is addressed by a LUT (Look Up Table) 19 in the signal power estimation unit 2.

After the wavelet packet decomposition unit 1, the presence of a measurement signal MS in any of the frequency sub-band is evaluated with the signal power estimation unit 2. The presence of a measurement signal is detected comparing the mean power values of all sub-bands. The signal power estimation unit 2 comprises two power estimation components 18. The power estimation components 18 perform power estimation on the outputs of the wavelet packet decomposition unit 1 in parallel. Initially, the output values of the wavelet packet decomposition unit 1 are squared and processed with a first order lowpass filter circuit. The total amount of signal processed by each output of the wavelet packet decomposition unit 1 equals half the total amount of sub-bands. A shift-register 20 with the same depth as the signals processed by a signal output of the wavelet packet decomposition unit 1 is used to store the estimated signal power of each sub-band. Each clock cycle a new output value from the wavelet packet decomposition unit 1 arrives to the signal power estimation unit 2 and passes through the lowpass filter circuit. The mean signal power of this sub-band is afterwards compared with the value stored in memory 21 which represents the highest mean signal value of all the sub-bands processed in the path. The register 20 does not store the highest calculated power value of a sub-band but is always updated with the most recent value. In this way, the comparison between the latest signal power values of the sub-bands prevents the system from not detecting a change in frequency and sub-band of the measurement signal MS. The time stamp of the signal arrival at power estimation components 18, which univocally identifies the sub-band being processed by the wavelet packet decomposition unit 1 is evaluated using the binary counter 17. The time stamp of the sub-band with the highest signal power is stored in memory 22 if the sub-band is the result of lowpass filtering process in the wavelet packet decomposition unit 1 or in a memory 23 if the sub-band is the result of highpass filtering process in the wavelet packet decomposition unit 1.

For some applications it may be necessary to avoid the output of the lowest frequency sub-bands as small offsets in the ADC (Analog-Digital-Converter) samples increase the power of the noise floor of these sub-bands hiding the measurement signal. For this reason the LUT 19 is implemented in order to exclude these sub-bands. The number of low frequency sub-bands avoided is related to the specific application.

The last segment of the signal power estimation unit 2 is used to compare the power values which are stored in memory or register of the two sub-bands whose index is stored in the memories 22, 23 respectively. This comparison is performed in comparator 24 and it is used to evaluate in which of the two outputs of the wavelet packet decomposition unit 1 the measurement signal MS is located. The outcome of this comparison is used to tune the multiplexing block 26 in the upsampling unit 3, where only one of the two parallel outputs of the wavelet packet decomposition unit 1 is processed. In addition, the corresponding register 22 or 23 returns the time stamp in which the sub-band with the highest power is processed in the wavelet packet decomposition unit 1 and feeds this information to the signal router 27. Through the signal router 27 only the sub-band with the highest output power is processed in the upsampling unit 3. The time stamp is also used to recover the proper sub-index by means of a look-up table 25.

The output signals of the wavelet packet decomposition unit 1 have frequency components that span from zero to the new Nyquist frequency which is lowered during downsampling. Due to the downsampling and filtering cascade frequencies that are located in any of the original signal spectrum can end up being close to the 0 frequency or to the new Nyquist frequency. Generally, phase/frequency detector PLLs have difficulties in locking a signal if its frequency is too close to the 0 frequency or to the Nyquist frequency. Moreover, the reduced clock frequency of the phase/frequency detector PLL would increase the time required to lock the signal.

These system limitations are overcome by the upsampling unit 3. The upsampling unit 3 does not reconstruct the original signal spectrum but the frequency components are mapped into a specific frequency range regardless of the sub-band where the measurement signal MS is. This allows a unique tuning of parameters of the phase detector 4 and the loop filter 5 regardless of the initial frequency of the measurement signal MS. With a free staged upsampling sequence the upsampling unit 3 converts the output of the wavelet packet decomposition unit 1 into a signal whose sampling frequency matches the sampling frequency of the measurement signal MS before the wavelet packet decomposition unit 1.

As the last downsampling stage is omitted in the implementation of the wavelet packet decomposition unit 1, the output signal of a lowpass filter in the last stage of the wavelet packet decomposition unit 1 only contains frequency components below half of its Nyquist frequency while the output signal of the highpass filter contains frequency components around the Nyquist frequency. In the upsampling unit 3 after the element 27, the signal is then upsampled by a factor of two. The upsampling is performed inserting additional zeros (so-called zero padding technique) between each sampled value. This technique introduces periodic repetitions of the signal frequency components in the frequency spectrum. After this first upsampling process, frequency components close to the zero a mirrored close to the new Nyquist frequency (and all its multiples) while any high frequency component remains close to the old Nyquist frequency (and all its multiples). For such a reason, instead of implementing an anti-imaging lowpass filter in the order to cut a higher frequency component a highpass filter 28 having the same structure as a high pass filter of the wavelet packet decomposition unit 1 is used. The filtering removes any frequency component close to zero while any higher frequency component or mirrored frequencies are not filtered. Changes in the amplitude of the signal are avoided using a gain amplification of two.

In the second stage of the upsampling unit 3 the signal is once more upsampled and then filtered using a lowpass filter 29. This time, the filtering is performed using a lowpass filter 29 in order to remove all frequency components that are close or higher than the Nyquist frequency after this new upsampling. The frequency response of the filter has to be very sharp in order to avoid signal attenuation in the frequency range of interest. For this filtering process, a lowpass filter structure as the one implemented in the wavelet packet decomposition unit 1 is used.

The original sampling frequency is achieved by means of a last upsampling stage 30. Since the repetitions in the frequency spectrum are widely separated, a single lowpass filter 31 is used to perform the anti-imaging. In this case a fifth order elliptic lowpass filter in the minimum multiplier allpass structure is used. Regardless of the total amount of stages in the wavelet packet decomposition unit 1 after the upsampling unit 3 all frequency components are mapped into the third or fourth sub-band in which the wavelet packet decomposition unit 1 has subdivided the frequency spectrum (i.e., the sub-band location of the measurement signal is related to the last filtering process of 1 that locates the frequency of the measurement signal to its sub-band).

Both, the wavelet packet decomposition unit 1 and the upsampling unit 3, need sharp halfband filters. For a lowpass filter, the attenuation of the higher frequencies has to minimize the impact on the remaining signal through aliasing. The attenuation in the passband must be small enough so that signals in the whole remaining frequency range can be detected. To test the system, the filters implemented in the wavelet packet decomposition unit 1 and the upsampling unit 3 are 13th order elliptic filters with a maximum passband ripple of 0.5 dB. Even though this attenuation causes a signal power loss of almost 11% it does not compromise the signal detection. The passband edge is chosen to be at normalized frequency 0.25 and the stopband starts at 0.25005. In the stopband the attenuation is higher than 34 dB. Thus, the noise power of the measurement signal is reduced of 3 dB. The values used in the previous description are just an example of a possible filter implementation. A different implementation would change the system performance but not the operating principle.

Figure 3:
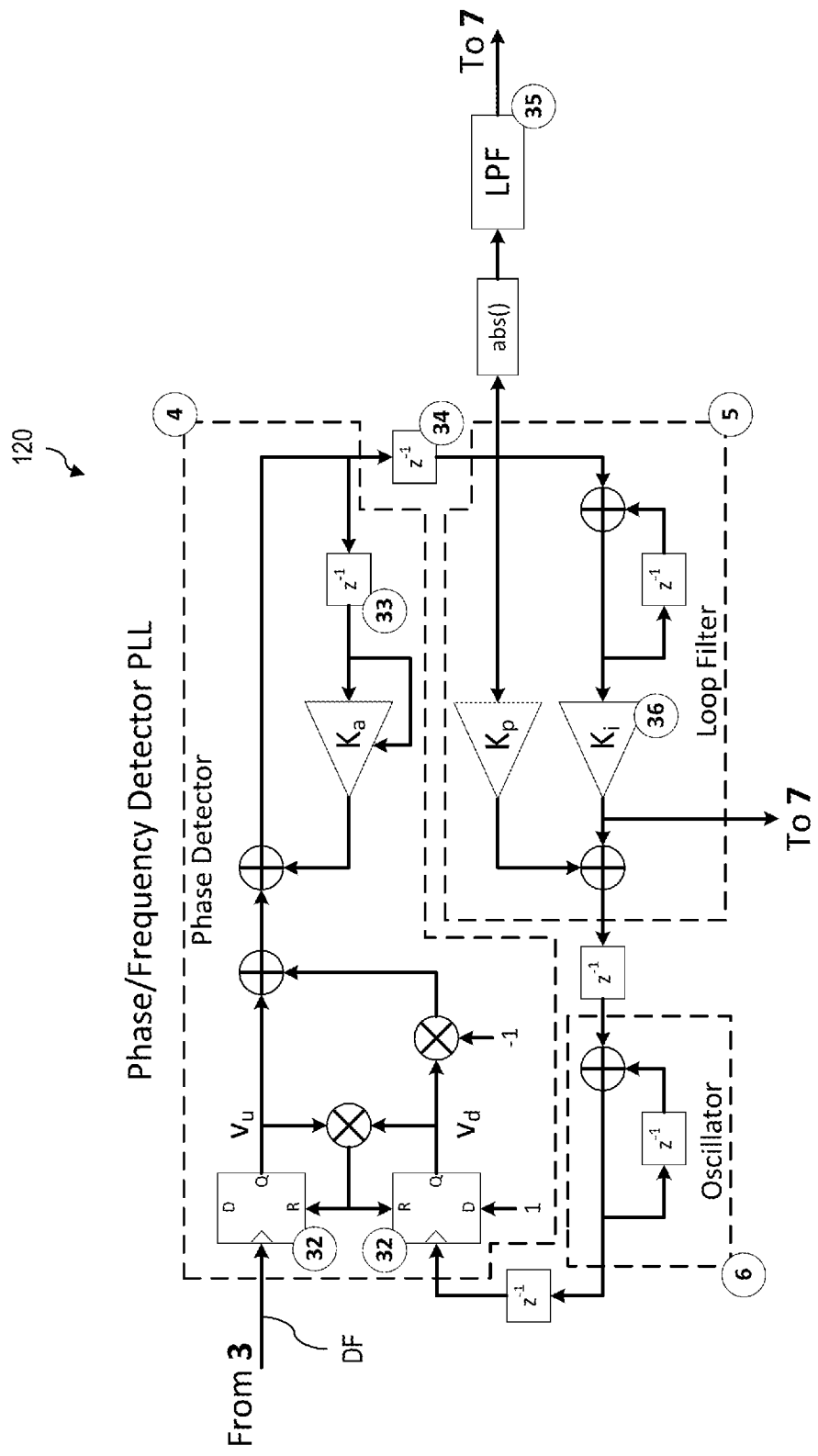
FIG. 3 is a more detailed block diagram of a phase/frequency detector PLL subsystem architecture.

The outcome of the upsampling unit 3 is fed into a phase detector unit 4 of the phase/frequency detector PLL 120. A more detailed block diagram of the phase/frequency detector PLL 120 and the phase detector unit 4 is depicted in FIG. 3. The phase detector unit 4 which is used to determine differences in phase and frequency by comparing the rising edges of the oscillator 6 and the input from the upsampling unit 3 using two D-flipflops 32. For simplicity, it is possible to represent both the edge detection signals each with a single bit. A rising edge is detected storing the previous sample value and comparing it with the actual value. If a rising edge is detected from the upsampling unit 3, the auxiliary signal vu becomes one. If a rising edge occurs in the oscillator 6, a signal vd is set to one. In case both vu and vd are equal to one, both D-flipflops 32 are reset. In the case only one of the two signals is unitary, the charge pump's (33) output value is increased if vu is unitary or decreased if vd is unitary. The digital implementation of the charge pump 33 is a limited integrator whose absolute value is decreased at each clock cycle by the factor Ka. For lock detection, the absolute value of the phase detector unit 4 is fed into a lowpass filter 35. The parameters of a loop filter 5 are optimized in order to reduce the lock time of this PLL. The frequency value fed to the oscillator 6 is directly the output value of the loop filter 5. In the locked state the output value of the loop filter is close to zero. Therefore, the loop filter 5 has to include an integrator. The loop filter 5 is implemented using a PI controller.

Since the two input signals of the phase detector unit 4 are single bits, the oscillator 6 consists of a phase register that accumulates a frequency value at its input. The output signal of the oscillator 6 is the MSB (Most Significant Bit) of the phase register. Since the oscillator 6 is implemented in digital hardware the range of 0 to 2π is mapped to a power of two such that overflows take care of the modulo operation. The maximum phase step in one clock cycle is π and equals half of the clock frequency. Larger values would lead to a lower output frequency and so the frequency word can be one bit smaller than the phase accumulator. The register length of the oscillator 6 can be parameterized in order to make an adequate frequency guess. With a clock frequency of 100 MHz, a phase accumulator with a register length of 16 bits returns in a minimum frequency step of 1526 Hz. This value is sufficiently small and allows the main PLL to 7 (cf. FIG. 1) to pull-in and lock the input signal. The register size is incremented in presence of high SNR in order to avoid the loss of the LSBs (Least Significant Bits).

In order to detect whether the lock frequency of the phase/frequency detector PLL 120 is reliable, the output of the register 34 is processed through the lowpass filter 35. The absolute value of the register 34 is fed into the lowpass filter 35 which returns the first four MSBs of its filtered signal. The lowpass filter 35 is used as a performance indicator that controls the re-initialization of the main PLL frequency through the main PLL 7. As the signal processed in the lowpass filter 35 is already smoothed by the charge pump 33, the filter implemented is a first order Butterworth filter.

The oscillator frequency of the phase/frequency detector PLL 120 which is used for the frequency estimation in the frequency recovery unit 7 is not derived directly from the oscillator 6 but as outcome of the loop filter 5. The frequency is estimated with loop filter 5 only using the integral part 36 of the PI controller due to the behavior of the phase/frequency detector PLL 120 in a noisy environment. The integral part 36 tunes the oscillator in order to match the frequency of the input signal while the proportional part of the loop filter compensates the residual phase difference. Since this PLL structure is sensitive to cycle slips in presence of noise, the input of the oscillator 6 is used to track the phase. Therefore, its mean frequency can differ from the frequency of the PLL's input signal. The integral part 36 is instead a more accurate estimate of the frequency of the PLL's input signal.

The frequency of the measurement signal is estimated in the main PLL 7 based on the outcome of look-up-table (LUT) 25 and the loop filter 5. Since the sub-band of the wavelet packet decomposition unit 1 with the highest signal power is not reconstructed but upsampled, the frequency value of loop filter 5 cannot be fed directly into the loop filter 10 which is part of the main PLL unit 200. The frequencies in odd numbered sub-bands of the wavelet packet decomposition unit 1 (starting to count from low frequencies to high frequencies and labelling as zero the first sub-band) are mirrored when using the classical implementation of the wavelet packet decomposition unit 1 which includes a final signal downsampling. Being this not the case of the chosen implementation architecture, the output signals of the highpass filter remain above the Nyquist frequency and are not mirrored. In terms of sub-bands this results in the two lowest sub-bands not being mirrored, the following two being mirrored and so forth. During the upsampling process in the upsampling unit 3, all of the frequencies are mirrored regardless on the sub-band. As mentioned beforehand, the upsampling process is designed such that the outcome of a highpass filter is mirrored in the third sub-band in which the wavelet packet decomposition unit 1 has divided the electronics frequency range while the outcome of the lowpass filter is always mirrored in the fourth sub-band of this frequency range. This expedient allows optimizing the performance of the phase/frequency detector PLL 120 around a well-defined frequency interval.

In order to recover the original frequency value of the input signal, the two LSBs of the sub-band index (also expressed in bits) derived in the signal power estimation unit 2 from the look-up-table 25 are used. This leads to four different cases:

LSBs=00: The frequencies are mirrored after the upsampling unit 3. The frequency sub-band containing the input signal is obtained after a lowpass filtering process. Due to the upsampling unit 3, all frequency components can be found in the fourth sub-band of the electronics frequency range. The input frequency of the loop filter 10 is (isb+4)·Δfsb−fosc being isb is the sub-band index expressed in decimal units derived from the look-up-table 25, Δfsb is the frequency width of the sub-bands and fosc is the frequency value derived from the output of the integral part 36 in the loop filter 5.

LSBs=01: The frequencies are mirrored after the upsampling unit 3. The frequency sub-band containing the input signal is obtained after a highpass filtering process. Due to the upsampling unit 3, all frequency components can be found in the third sub-band of the frequency spectrum. The input frequency of the loop filter 10 is (isb+3)·Δfsb−fosc where the equation terms have been defined beforehand.

LSBs=10: The frequencies are not mirrored after the upsampling unit 3. The frequency sub-band containing the input signal is obtained after a highpass filtering process. Due to the upsampling unit 3, all frequency components can be found in the third sub-band of the frequency spectrum. The input frequency of the loop filter is (isb−2)·Δfsb+fosc where the equation terms have been defined beforehand.

LSBs=11: The frequencies are not mirrored after the upsampling unit 3. The frequency sub-band containing the input signal is obtained after a lowpass filtering process. Due to the upsampling unit 3, all frequency components can be found in the fourth sub-band of the frequency spectrum. The input frequency of the loop filter 10 is (isb−3)·Δfsb+fosc where the equation terms have been defined beforehand.

The output of lowpass filter 35 is used to decide whether the frequency of the main PLL unit 200 has to be reinitialized. The estimated frequency is compared to the frequency value of the main PLL 200 measured in the register 37 of loop filter 10 (see FIG. 4). If their difference exceeds a prefixed value (defined in a LUT also implemented in the frequency recovery unit 7) and the main PLL is not already locked, its frequency is reinitialized. Since the lowpass filter 35 is an index of the reliability of the frequency estimation (lower values are better) the first bit of the lowpass filter 35 has to be zero. The re-initialization occurs by setting the frequency value in the register 37 to the one determined with the criteria described beforehand. In order to feed the frequency estimated in the frequency recovery unit 7 in the register 37 of the loop filter 10 of the main PLL unit 200, additional zeros have to be added as LSBs as the register size of the register 37 is longer than the frequency bit word calculated in the frequency recovery unit 7. The main PLL frequency re-initialization is operated in the register 37 so that the oscillator 11 of main PLL unit 200 can directly process the output signal of the loop filter 10. Once the main PLL unit 200 reaches a locked state, a new initialization of the register 37 in the loop filter 10 occurs only if the main PLL unit 200 loses lock.

Figure 4:
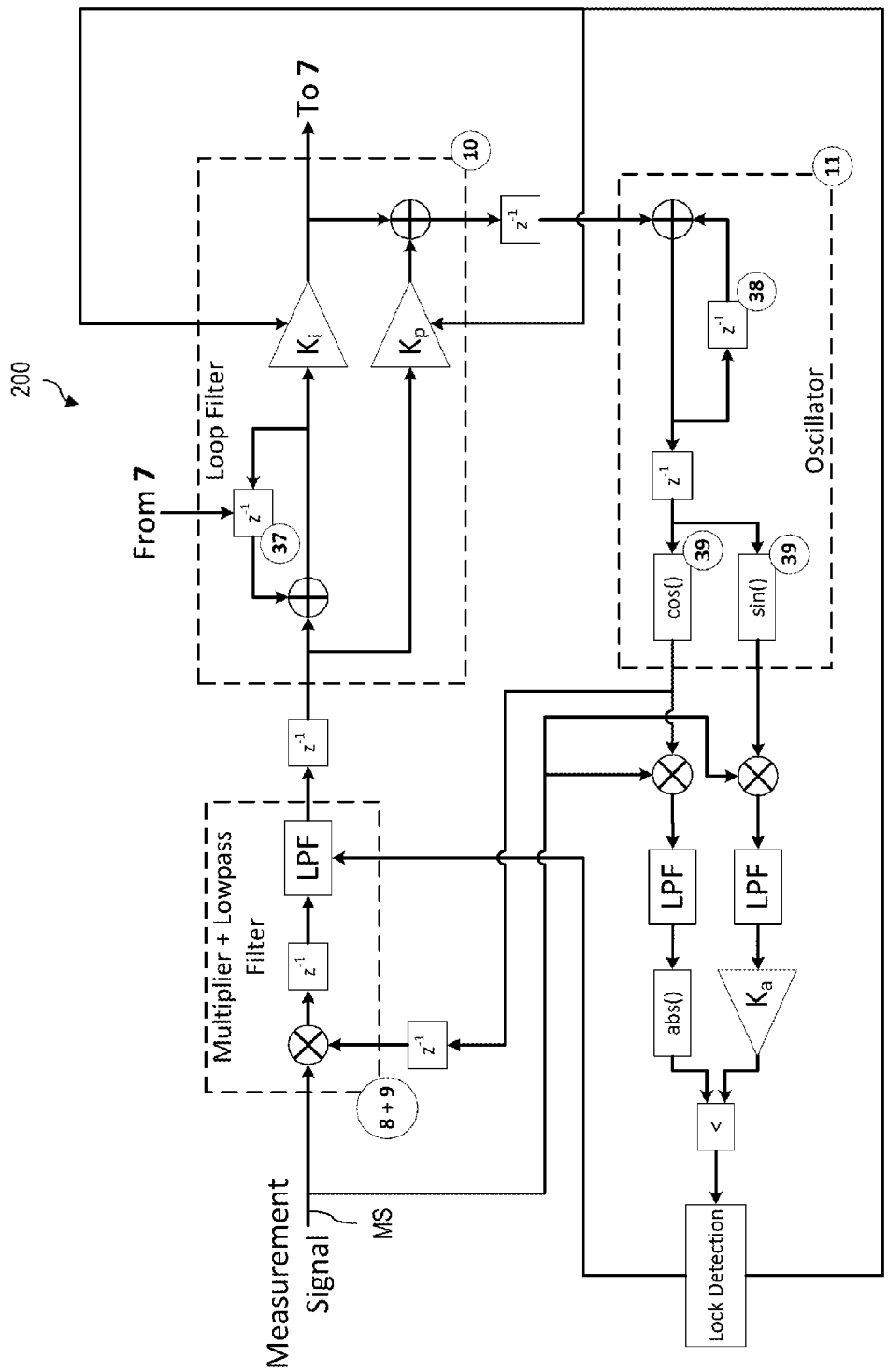
FIG. 4 is a more detailed block diagram of a main PLL unit.

A detailed block diagram of the main PLL unit 200 is depicted in FIG. 4. Its implementation is based on its classical architecture and therefore comprises a multiplier 8, a lowpass filter 9, the loop filter 10 and an oscillator 11. The phase difference calculation between the measurement signal MS and the output signal of 11 is performed by multiplying, for each sample, the measurement signal MS with the cosine of the signal generated in 11. The high frequency component that derives from this product has to be attenuated with influencing the loop performance. For this purpose an IIR Butterworth lowpass filter 9 with a very low normalized cut of frequency is implemented. The architecture of the lowpass filter 9 consists in first order filters working in cascade and uses powers of two as filter coefficients in order to simplify the overall filter structure. The cut-off frequency can be changed by either tuning the coefficients or varying the filter order. It is important not to truncate intermediate results as well as the outputs of a filtering process but to round them. Otherwise the resulting additive error processed in the loop filter would have a negative mean value. This would worsen the PLL performance in presence of a large dynamic range of the measurement signal as the constant magnitude of the error signal causes variable phase offsets that depends on the amplitude of the measurement signal.

The error signal used to operate the loop filter (which is derived after the lowpass filter 9) cannot be used as a lock detection flag. If the PLL is locked the error signal is small and its dynamics is driven by the noise of the measurement signal MS. If the two frequencies have an offset in the range of the loop bandwidth, the error signal amplitude increases.

Nevertheless, a small amplitude of the error signal is also measured when the frequency of the oscillator 11 and the frequency of the measurement signal MS have a big offset. This artefact is caused by the lowpass filter 9 as it attenuates the higher frequency components. In order to evaluate if the PLL is locked or not, the measurement signal is directly mixed with the second output of the oscillator 11 as well. If the PLL is close to locking the measurement signal MS, the mean value of this product equals approximately half of the amplitude of the measurement signal otherwise it is a duplicate of the error signal. A lock is achieved when the ratio between these two signals exceeds a fixed threshold value (the magnitude of this threshold value is related to the noise floor and the maximum amplitude of the measurement signal). As a consequence of the lowpass filtering process in this calculation, the lock signal is delayed of approximately 50 μs in time.

The implementation of the loop filter 10 is the same as in the loop filter 5 with a difference in the controller parameters and registers size (larger registers are used for the loop filter 10 in order to perform more accurate measurements). The parameters of the oscillator 11 are chosen in order to guarantee optimal performance in terms of phase measurements and locking time. They can be evaluated using the classical theory of PI controllers.

A loop bandwidth of 10 kHz increases the phase measurement accuracy while a loop bandwidth of 100 kHz reduces the time required from the main PLL to lock the measurement signal. For such a reason, the main PLL is designed to operate in two different modes: acquisition mode with 100 kHz loop bandwidth and measurement mode with 10 kHz loop bandwidth, respectively. When the main PLL unit 200 is locked to the measurement signal MS, it is operated in measurement mode otherwise in acquisition mode. The mode switch is controlled by monitoring the lock signal and is operated by changing the parameters of the lowpass filter 9 and the loop filter 10.

The loop filter 10 locks to the measurement signal if the output signal of the oscillator 11 is phase shifted of −90 degrees with respect to the measurement signal MS. For the lock detection, a sinusoidal output is also implemented in the oscillator 11. The architecture of the oscillator 11 uses a single phase accumulator 38 and a sine table by means of a dual port ROM 39. Due to the symmetrical properties of a sinusoidal signal, it is sufficient to store only the values of a quarter of a period plus one.

For the high precision phase measurements it is necessary that the phase accumulator has no overflow at $2\pi$. On the other side it is hardly possible to implement huge look-up-tables in embedded hardware. For this reason only some of the middle bits are used to address the look-up-table and the MSBs and LSBs are discarded. The register length of the phase accumulator and the frequency word can be independently parameterized.

The last stage of the phasemeter is dedicated to the decimation of the data of interest for consequent signal processing. Since the frequency components in the signal of interest are below one Hz, extensive downsampling can be performed. In the downsampling process an anti-aliasing lowpass filter is required. A downsampling factor of 222 decreases the sampling frequency from 50 MHz to about 12 Hz. To avoid aliasing artefacts in the signal of interest the attenuation around the output sampling frequency at 11 Hz to 13 Hz has to be sufficiently high. If aliasing artefacts in the higher frequency range are allowed, an accumulator can take care of the filtering. The accumulator adds the input signal values to its register until a rising edge in the slower output clock signal occurs. At that point in time the decimation filter provides the current accumulator value on its output while the accumulator itself is reset to zero. Basically this is a FIR filter with a rectangular impulse response. In the frequency domain this corresponds to a sin c function. Even if the attenuation at higher frequencies is very low and leads to heavy aliasing, this filter has a huge advantage. The zeros of the sin c function are located at every multiple of the output sampling frequency. This ensures that the signal of interest is not affected by aliasing and thus a good reason for using this very simple filter structure.

Figure 5:
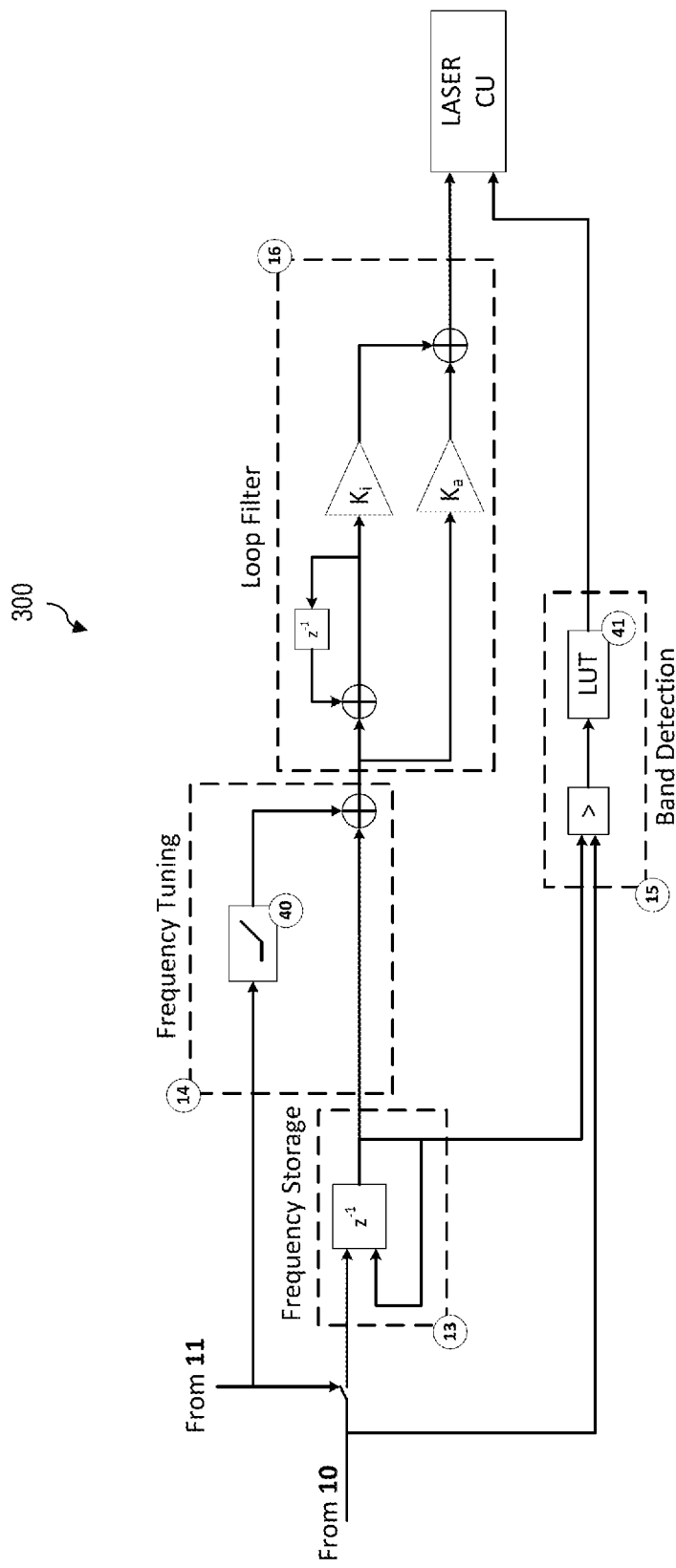
FIG. 5 is a more detailed block diagram of a band detection subsystem.

Once the main PLL unit 200 is locked and has switched to measurement mode, the lock signal and the lock frequency are sent to the Band Detection Subsystem 300. A detailed block diagram of this subsystem is depicted in FIG. 5. Here, the lock frequency measured in the loop filter 10 is stored in a register 13. The lock signal is also used to trigger a ramp signal 40 in a frequency tuning unit 14 which is continuously added to the lock frequency value stored in the register 13. The ramp signal 40 is used to change the laser frequency in a well-defined way. Since the main PLL unit 200 in measurement mode is capable of detecting frequency changes in the KHz region, the ramp is used to change the frequency of the laser of a few hundred of KHz. The exact value is related to the signal noise floor and the sensitivity of the main PLL unit 200. A loop filter 16 is used to operate a PZT of the laser crystal. Therefore, the ramp signal 40 requires a slope compatible with a maximum frequency change rate achievable with the PZT. The updated frequency value is compared with the frequency lock value stored in the register 13 and determines the detection band using a look-up-table 41 in the band detection unit 15. The two possible outcomes of the comparison determine the detection band of the phasemeter. In particular, if the frequency during the ramp tuning increases with respect to the frequency stored in the register 13, the frequency of the reference laser beam is higher than the frequency of the received beam. In the opposite case, the frequency decreases during the ramp tuning. This information is used to initialize properly the parameters of the laser control unit and lock the laser to the incoming light signal. A wrong assumption on the phasemeter detection band would lead to an erroneous tuning of the laser frequency while trying to lock it to the incoming light signal. This would rapidly bring the whole phasemeter out of lock. Once the phasemeter band has been detected, the Band Detection subsystem 300 is bypassed and the laser frequency is controlled by its control unit.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE LIST 1 wavelet packet decomposition unit
2 signal power estimation unit
3 upsampling unit
4 phase detector unit
5 loop filter
6 oscillator
7 frequency recovery unit
8 multiplier
9 lowpass filter (Butterworth filter)
10 loop filter
11 oscillator
12 decimation
13 register
14 frequency tuning unit
15 band detection unit
16 loop filter
17 binary counter
18 power estimation components
19 look-up table (LTU)
20 shift register
21 memory
22 memory
23 memory
24 comparator
25 look-up table (LUT)
26 multiplexing block
27 signal router
28 highpass filter
29 lowpass filter
30 upsampling stage
31 lowpass filter
32 D-flipflop
33 charge pump
34 register
35 lowpass filter
36 integral part
37 register
38 single phase accumulator 39 ROM
40 ramp signal
41 look-up table (LUT)
42 stage filter
43 multiplexer
100 frequency detection subsystem
110 wavelet subsystem
120 phase/frequency detector PLL
200 main PLL unit
300 phasemeter band detection subsystem
MS measurement signal
DF detected frequency
$v_n$ auxiliary signal
$v_d$ signal
ADC Analog to Digital Converter
CU Control Unit
DFFT Digital Fast Fourier Transform
FFT Fast Fourier Transform
FPGA Field Programmable Gate Array
LSB Least Significant Bit
LUT Look Up Table
MSB Most Significant Bit
PI Proportional-Integral
PLL Phase-Locked Loop
SNR Signal-to-Noise Ratio
VCO Voltage Controlled Oscillator
HPF Highpass Filter
LPF Lowpass Filter

The invention claimed is:

1. A signal acquisition and distance variation measurement system for laser ranging interferometers having a signal acquisition unit, comprising:
a frequency detection subsystem configured to detect the frequency of a measurement signal of a received laser beam which is buried in noise, wherein the frequency detection subsystem comprises an acquisition subsystem with a wavelet packet decomposition unit and a phase/frequency detector PLL;
a main PLL unit being coupled to the frequency detection subsystem configured to receive the detected frequency of the measurement signal for phase estimation of the measurement signal;
a phasemeter band detection subsystem configured to detect whether the frequency of the measurement signal is higher or lower than the frequency of a reference signal of a reference laser beam by operating a known change to the frequency of the reference signal and measuring the consequent change in the frequency of an interference signal for having the phase of the reference signal locked to the phase of the measurement signal.

2. The signal acquisition and measurement system according to claim 1, wherein the acquisition subsystem comprises a signal power estimation unit.

3. The signal acquisition and measurement system according to claim 1, wherein the acquisition subsystem comprises an upsampling unit.

4. The signal acquisition and measurement system according to claim 2, wherein the upsampling unit and all units after the upsampling unit are not triggered by the wavelet packet decomposition unit and the signal power estimation in case no measurement signal is received.

5. A signal acquisition and distance variation measurement system for laser ranging interferometers having a signal acquisition unit, comprising:
a frequency detection subsystem configured to detect the frequency of a measurement signal of a received laser beam which is buried in noise, wherein the frequency detection subsystem comprises an acquisition subsystem with a wavelet packet decomposition unit and a phase/frequency detector PLL;
a main PLL unit being coupled to the frequency detection subsystem configured to receive the detected frequency of the measurement signal for phase estimation of the measurement signal;
a phasemeter band detection subsystem configured to detect whether the frequency of the measurement signal is higher or lower than the frequency of a reference signal of a reference laser beam by operating a known change to the frequency of the reference signal and measuring the consequent change in the frequency of an interference signal for having the phase of the reference signal locked to the phase of the measurement signal,
wherein the phasemeter band detection subsystem comprises a signal storing unit, a frequency tuning unit and a band detection unit.

6. A signal acquisition and distance variation measurement system for laser ranging interferometers having a signal acquisition unit, comprising:
a frequency detection subsystem configured to detect the frequency of a measurement signal of a received laser beam which is buried in noise, wherein the frequency detection subsystem comprises an acquisition subsystem with a wavelet packet decomposition unit and a phase/frequency detector PLL;
a main PLL unit being coupled to the frequency detection subsystem configured to receive the detected frequency of the measurement signal for phase estimation of the measurement signal;
a phasemeter band detection subsystem configured to detect whether the frequency of the measurement signal is higher or lower than the frequency of a reference signal of a reference laser beam by operating a known change to the frequency of the reference signal and measuring the consequent change in the frequency of an interference signal for having the phase of the reference signal locked to the phase of the measurement signal,
wherein the main PLL unit comprises a mixing-phase detector PLL.

* * * * *